United States Patent
Summerfield et al.

(10) Patent No.: US 11,122,672 B2
(45) Date of Patent: Sep. 14, 2021

(54) ADJUSTABLE SAMPLE FLOOR FOR ULTRAFAST SIGNAL WASHOUT

(71) Applicant: Elemental Scientific Lasers, LLC, Omaha, NE (US)

(72) Inventors: Leif C. Summerfield, Bozeman, MT (US); Brock Meyer, Bozeman, MT (US)

(73) Assignee: ELEMENTAL SCIENTIFIC LASERS, LLC, Omaha, NE (US)

( * ) Notice: Subject to any disclaimer, the term of this patent is extended or adjusted under 35 U.S.C. 154(b) by 10 days.

(21) Appl. No.: 16/605,392

(22) PCT Filed: Apr. 20, 2018

(86) PCT No.: PCT/US2018/028573
§ 371 (c)(1),
(2) Date: Oct. 15, 2019

(87) PCT Pub. No.: WO2018/195425
PCT Pub. Date: Oct. 25, 2018

(65) Prior Publication Data
US 2020/0051802 A1 Feb. 13, 2020

Related U.S. Application Data
(60) Provisional application No. 62/487,657, filed on Apr. 20, 2017.

(51) Int. Cl.
*H05H 1/26* (2006.01)
*H01J 49/04* (2006.01)
(Continued)

(52) U.S. Cl.
CPC ........... *H05H 1/26* (2013.01); *H01J 49/0463* (2013.01); *H01J 49/105* (2013.01); *G01N 2001/045* (2013.01)

(58) Field of Classification Search
CPC ........ B01L 9/00; B01L 99/00; H01J 49/0463; H01J 49/105; H05H 1/26; G01N 2001/045
(Continued)

(56) References Cited

U.S. PATENT DOCUMENTS

| 5,491,411 A | 2/1996 | Wellstood et al. |
| 6,388,262 B1 * | 5/2002 | Alani ............... H01J 37/20 250/442.11 |

(Continued)

FOREIGN PATENT DOCUMENTS

WO    2016102084 A1    6/2016

OTHER PUBLICATIONS

International Search Report and Written Opinion for International Application No. PCT /US2018/028573, Korean Intellectual patent Office, Korea, dated Jul. 31, 2018.
(Continued)

*Primary Examiner* — Nicole M Ippolito
(74) *Attorney, Agent, or Firm* — Kevin E. West; Advent, LLP

(57) ABSTRACT

Systems and methods for an adjustable sample floor for ultrafast signal washout are disclosed. In an embodiment, A target support configured to adjustably support a target within a sample chamber may include: a support frame that may configured to be inserted into the sample chamber, a support platform that may be disposed within the support frame, and a platform adjustment system that may be coupled to the support frame and the support platform. The platform adjustment system may be configured to adjust at least one of: a position and an orientation of the support platform relative to the support frame when the support frame is inserted into the sample chamber.

20 Claims, 6 Drawing Sheets

(51) Int. Cl.
*H01J 49/10* (2006.01)
*G01N 1/04* (2006.01)

(58) Field of Classification Search
USPC ................ 250/440.11, 441.11, 442.11, 443.1
See application file for complete search history.

(56) References Cited

U.S. PATENT DOCUMENTS

| | | |
|---|---|---|
| 2004/0045497 A1 | 3/2004 | Kriews et al. |
| 2009/0073586 A1 | 3/2009 | Fry et al. |
| 2014/0224775 A1 | 8/2014 | Sharp et al. |
| 2016/0320269 A1 | 11/2016 | Hilliard et al. |

OTHER PUBLICATIONS

Extended European Search Report for European Application No. 18788080.2, dated Oct. 5, 2020.

* cited by examiner

ADJUSTABLE SAMPLE FLOOR FOR ULTRAFAST SIGNAL WASHOUT

BACKGROUND

A powerful analytical technique such as Laser Ablation Inductively Coupled Plasma Mass Spectrometry (LA-ICPMS) may enable researchers to analyze highly sensitive elements and isotopes directly with solid samples. In LA-ICPMS, plume formation and diameter of ejected material during laser ablation may be directly related to sampling speed. Distance of sample target from outgoing gas sample port may also impact sampling speed. Also, spot ablation to achieve higher resolution imaging may mean less energy impacted to sample target and shorter plume travel, necessitating the sample target to be close to collection apparatus.

BRIEF DESCRIPTION OF THE DRAWINGS

In FIG. 1, the perspective view is provided relative to x-, y- and z-axes, each of which is orthogonal to the others.

In FIG. 2, the perspective view is provided relative to x-, y- and z-axes, each of which is orthogonal to the others.

FIG. 5 also illustrates a cross-section of a sample capture cell arranged over a target as if the target support were inserted into a sample chamber body of the sample chamber.

DETAILED DESCRIPTION

Figure 1:
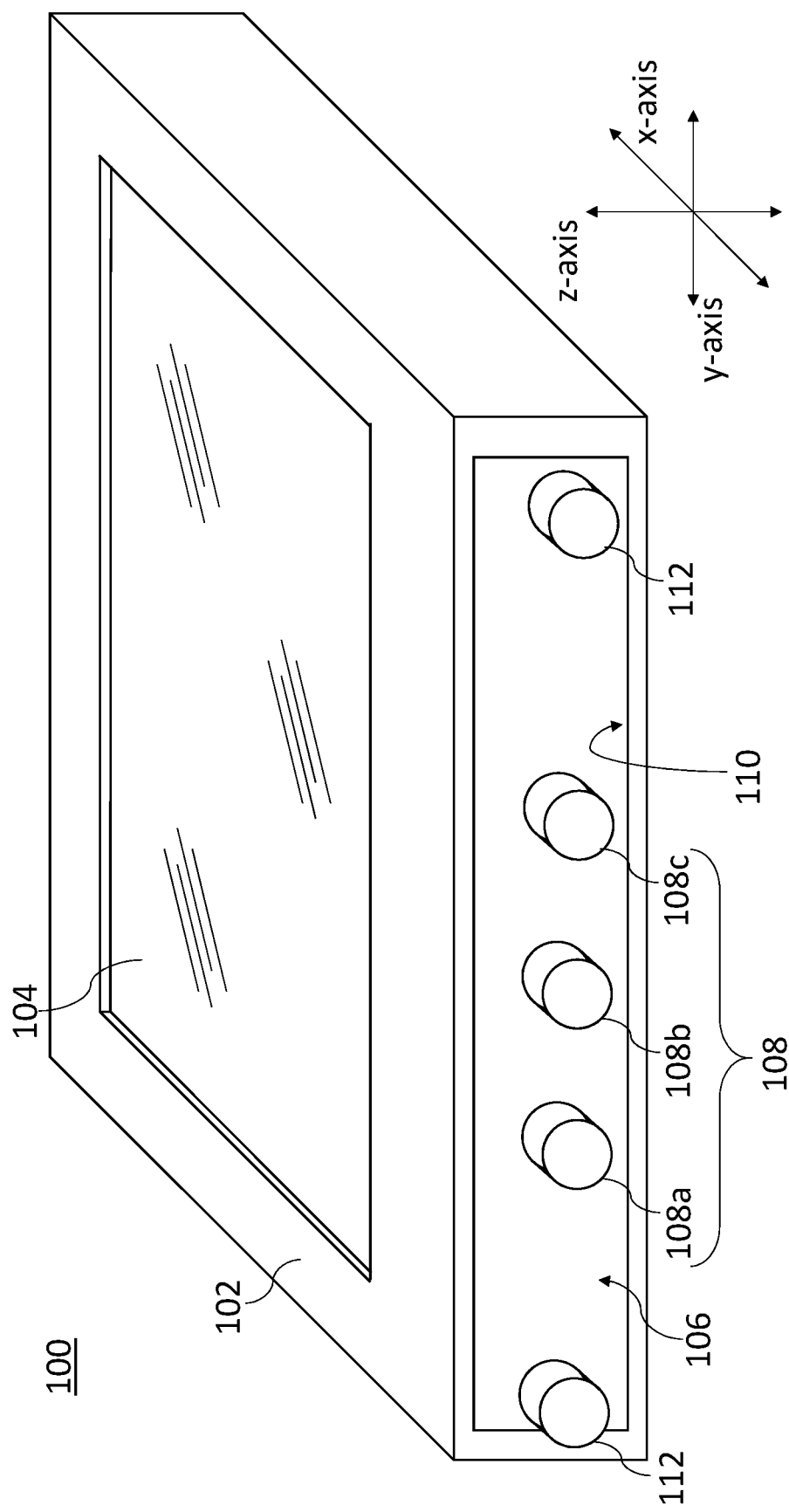
FIG. 1 is a perspective view illustrating a sample chamber according to one embodiment of the present disclosure.

Systems and methods for an adjustable sample floor for ultrafast signal washout are disclosed in accordance with example embodiments of the disclosure. According to one embodiment of the disclosure, a target support configured to adjustably support a target within a sample chamber may include a support frame that may be configured to be inserted into the sample chamber, a support platform that may be disposed within the support frame, and a platform adjustment system that may be coupled to the support frame and the support platform, wherein the platform adjustment system may be configured to adjust at least one of: a position and an orientation of the support platform relative to the support frame when the support frame may be inserted into the sample chamber.

According to another embodiment of the disclosure, a method can be provided. The method may include: adjusting a target support configured to support a target within a sample chamber. The target support may include a support frame configured to be inserted into the sample chamber, a support platform that may be disposed within the support frame; and a platform adjustment system that may be coupled to the support frame and the support platform, wherein the platform adjustment system may be configured to adjust at least one of: a position and an orientation of the support platform relative to the support frame when the support frame is inserted into the sample chamber.

According to another embodiment of the disclosure, a sample chamber that may be configured to accommodate a target can be provided. The sample chamber may include a sample chamber body, a transmission window; and a target support that may be configured to adjustably support the target within the sample chamber. The target support may include: a support frame that may be configured to be inserted into the sample chamber, a support platform that may be disposed within the support frame, and a platform adjustment system that may be coupled to the support frame and the support platform, wherein the platform adjustment system may be configured to adjust at least one of: a position and an orientation of the support platform relative to the support frame when the support frame is inserted into the sample chamber.

These and other example embodiments are now described in detail herein with reference to the accompanying drawings. Unless otherwise expressly stated, in the drawings, the sizes, positions, etc., of components, features, elements, etc., as well as any distances therebetween, are not necessarily to scale, but are exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular example embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one node could be termed a "first node" and similarly, another node could be termed a "second node", or vice versa.

Unless indicated otherwise, the term "about," "thereabout," "approximately," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. Spatially relative terms, such as "below," "beneath," "lower," "above," and "upper," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

It will be appreciated that many different forms, embodiments and combinations are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

One or more technical effects associated with certain embodiments herein may include, but are not limited to, tuning sample height for improvement in Inductively Coupled Plasma Mass Spectrometry (ICP-MS) or Inductively Coupled Plasma Optical Emission Spectrometry (ICP-OES) signal and three-point levelling of a target plane relative to laser focus. Certain embodiments herein may also have a technical effect of changing a location, for example, a height, of a target sample after it may be inserted into a sample chamber. Certain other embodiments herein may also have a technical effect of achieving small-spot sensitivity and improving small-spot collection efficiency. Certain other embodiments herein may also have a technical effect of improving sample insertion work-flow and customer experience. Certain other embodiments herein may also have the technical effect of improving sampling speed. The following provides detailed description of various example embodiments related to systems and methods for an adjustable sample floor for ultrafast signal washout.

Referring to FIG. 1, a sample chamber 100 of a sample generation system may be configured to accommodate, within an interior thereof, a target to be sampled by ablating a portion of the target with one or more laser pulses. Thus, in addition to the sample chamber 100, the sample generation system may further include a laser system (not shown) that may be configured to generate a focused beam of laser pulses to ablate the target accommodated within the sample chamber 100.

The sample chamber 100 may include a sample chamber body 102, a transmission window 104 and a target support 106. The sample chamber body 102 may define an interior into which the target support 106 can be inserted and removed (e.g., along the x-axis) through, for example, a chamber door 110 defined in the sample chamber body 102. With the target support 106 inserted into the sample chamber body 102, the interior of sample chamber body 102 may be at least substantially sealed (e.g., via an at least substantially airtight seal) from the environment outside the sample chamber body 102. Externally-adjustable sealing screws may be provided (e.g., as identified in FIGS. 1 to 3 at 112) to ensure that a suitable seal is created between the sample chamber body 102 and the target support 106. In one embodiment, the sealing screws 112 may each have dual piston-seals (e.g., using two tight, slip-fitting o-rings, not shown) to promote sealing of the sample chamber 100. A sealing member 114 (e.g., o-ring) may also be provided to promote sealing of sample chamber 100.

The sample chamber body 102 may include an opening (e.g., in an upper portion thereof, as illustrated in FIG. 1), and the transmission window may be coupled to the sample chamber body 102 so as to at least substantially seal (e.g., via an at least substantially airtight seal) the interior of the sample chamber body 102 from the environment outside the sample chamber body 102. The transmission window 104 may be formed of a material (e.g., fused silica) that is transparent to a wavelength of light of laser pulses to be directed into the interior of the sample chamber body 102 to ablate a portion of a target.

Figure 2:
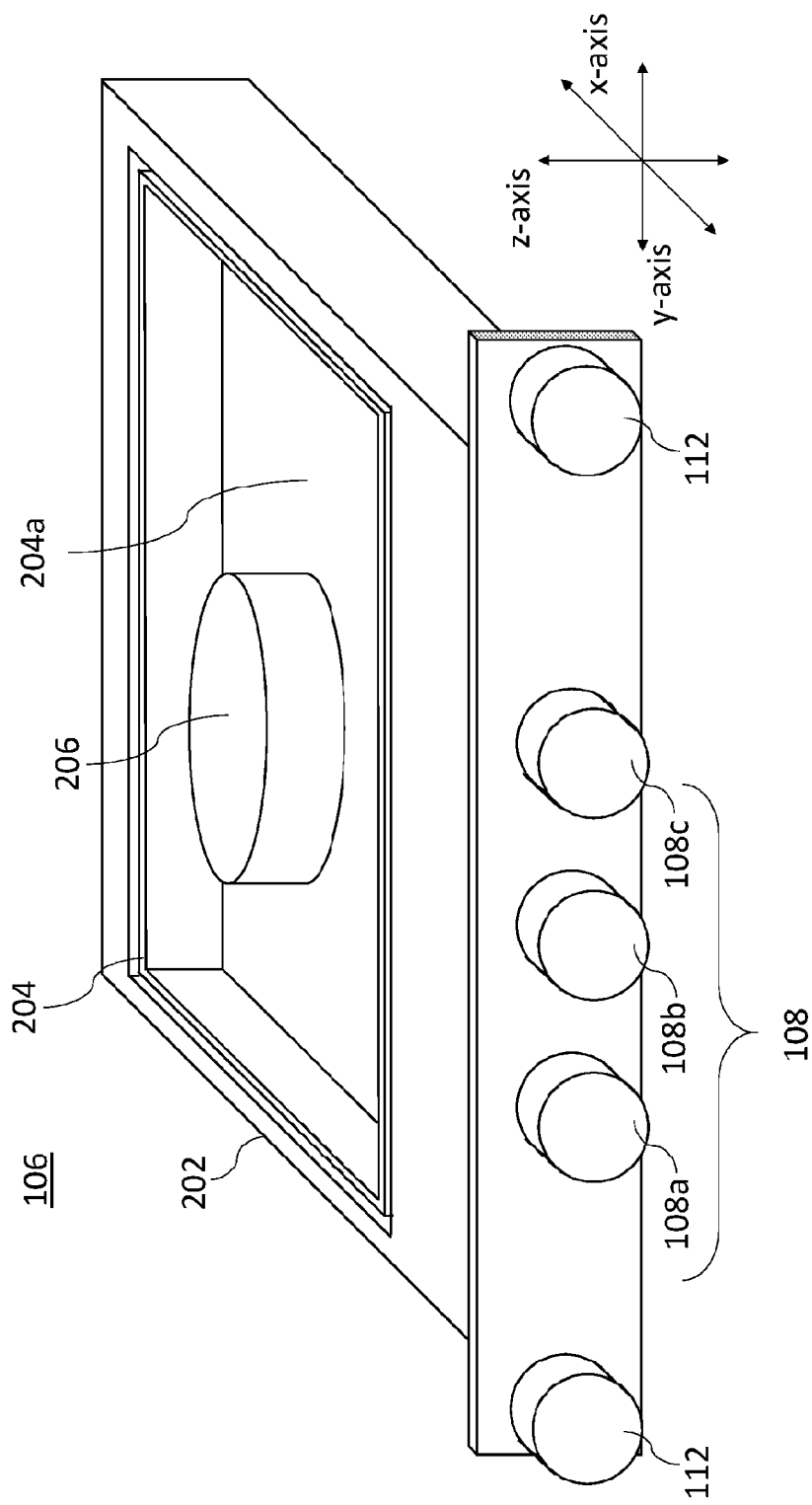
FIG. 2 is a perspective view illustrating a target support of the sample chamber shown in FIG. 1, according to one embodiment of the present disclosure.

The target support 106 may be configured to support a target within the interior of the sample chamber body 102 at a location beneath the transmission window 104. Referring to FIGS. 1 and 2, the target support 106 may include a support frame 202, a support platform 204 configured to support the target (e.g., illustrated as a target 206, which may have a generally flat upper surface, resting on a support surface 204a of the support platform 204) and a platform adjustment system that may be configured to adjust a position and/or orientation of the support platform 204 relative to the support frame 202. The support platform 204 can be formed of a metal material such as aluminum or an aluminum alloy, a clear acrylic glass, or the like or any combination thereof. Although not illustrated, the support platform 204 may include one or more features for holding a target, for holding a glass slide (e.g., 75 mm×25 mm, in length and width, respectively) on which the target may be located, for holding calibration material, or the like or any combination thereof.

The platform adjustment system can, for example, be configured to adjust a position or orientation of the support platform 204 relative to the support frame 202 along the z-axis, to adjust the roll of the support platform 204 relative to the support frame 202 (e.g., measured as rotation about an axis parallel to the x-axis), to adjust the pitch of the support platform 204 relative to the support frame 202 (e.g., measured as rotation about an axis parallel to the y-axis), or the like or any combination thereof. In the illustrated embodiment, the platform adjustment system may include one or more platform adjustment knobs 108 (e.g., a first platform adjustment knob 108a, a second platform adjustment knob 108b and a third platform adjustment knob 108c) that may be engaged (e.g., rotated) by a user to adjust a position of the support platform 204 relative to the support frame 202. Each one or more platform adjustment knobs 108 can be engaged by the user when the target support 106 is inserted into the sample chamber body 102, and when the target support 106 is removed from the sample chamber body 102.

Although not shown, the sample chamber body 102 may include one or more inlets (e.g., through which purge gas, carrier gas, or the like or any combination therefore can be introduced into the interior of the sample chamber body 102), one or more outlets (e.g., through which purge gas, carrier gas, an aerosolized sample, atmospheric gases, or the like or any combination thereof can be removed from the interior of the sample chamber body 102), or the like or any combination thereof. It should be recognized that any platform adjustment knob 108 may be engaged by the user to adjust a position of the support platform 204 relative to the support frame 202, before or after (or while) the interior of the sample chamber body 102 has been sealed, purged, or the like or any combination thereof.

Although not shown, the sample chamber 100 may typically include a sample capture cell arranged within the interior of the sample chamber body 102. Generally, the sample capture cell may be typically arranged beneath the transmission window 104 and above the target support 106 (when the target support 106 is inserted into the sample chamber body 102). When is inserted into the sample chamber body 102 and supporting a target (e.g., target 206), the target support 106 the sample capture cell may be arranged above the target 206. Moreover, and as will be described in greater detail below, the sample capture cell may be aligned with an axis along which the beam of laser pulses can propagate to ablate the target such that, when the target is ablated, the sample capture cell can capture a plume of particles and/or vapor ejected or otherwise generated from the target as a result of the laser ablation. The captured plume may then be transported, as an aerosol, to an analysis system by any suitable means known in the art.

Figure 3:
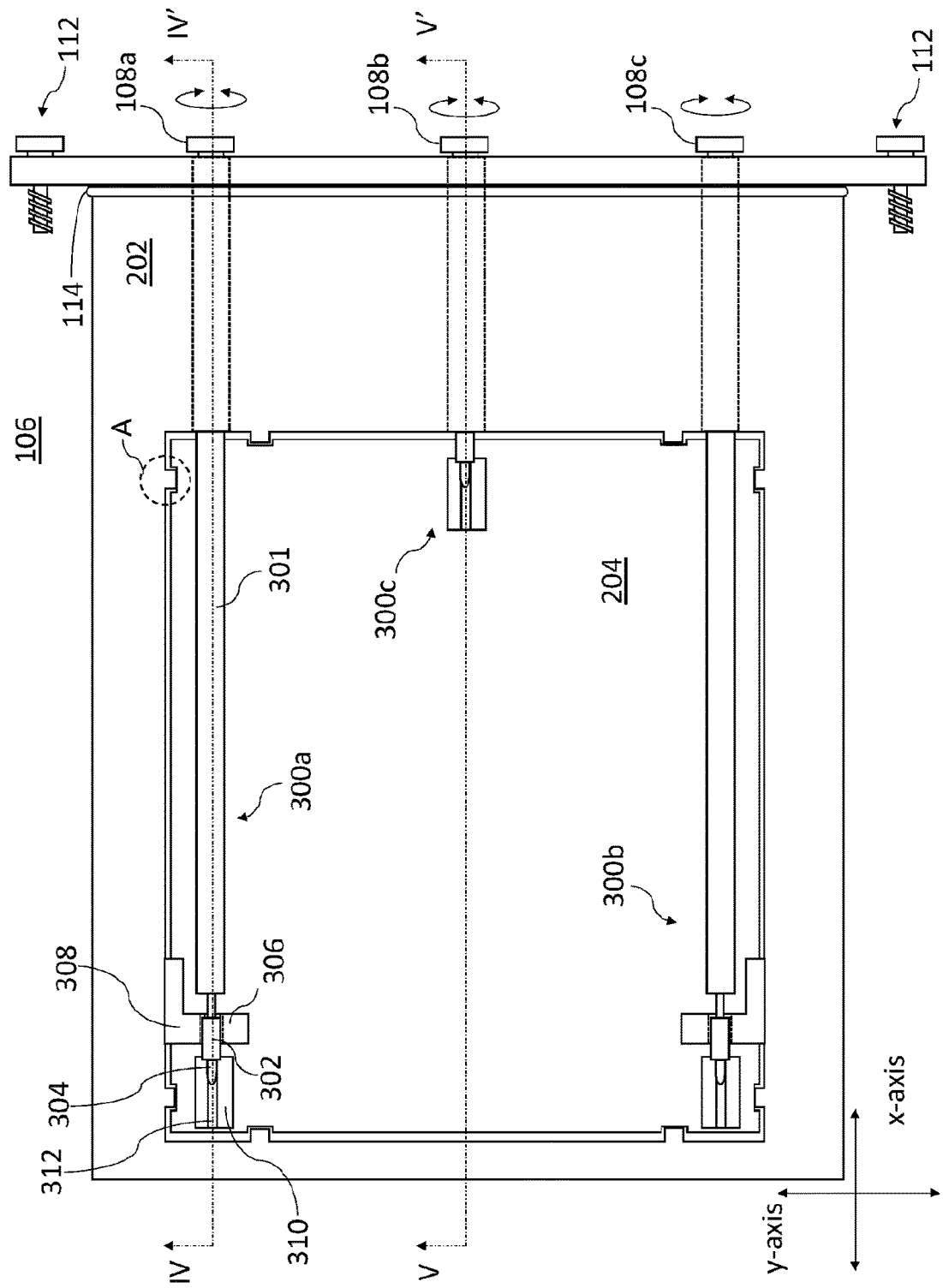
FIG. 3 is a bottom plan view of the target support shown in FIG. 2, according to one embodiment of the present disclosure.
Figure 4:
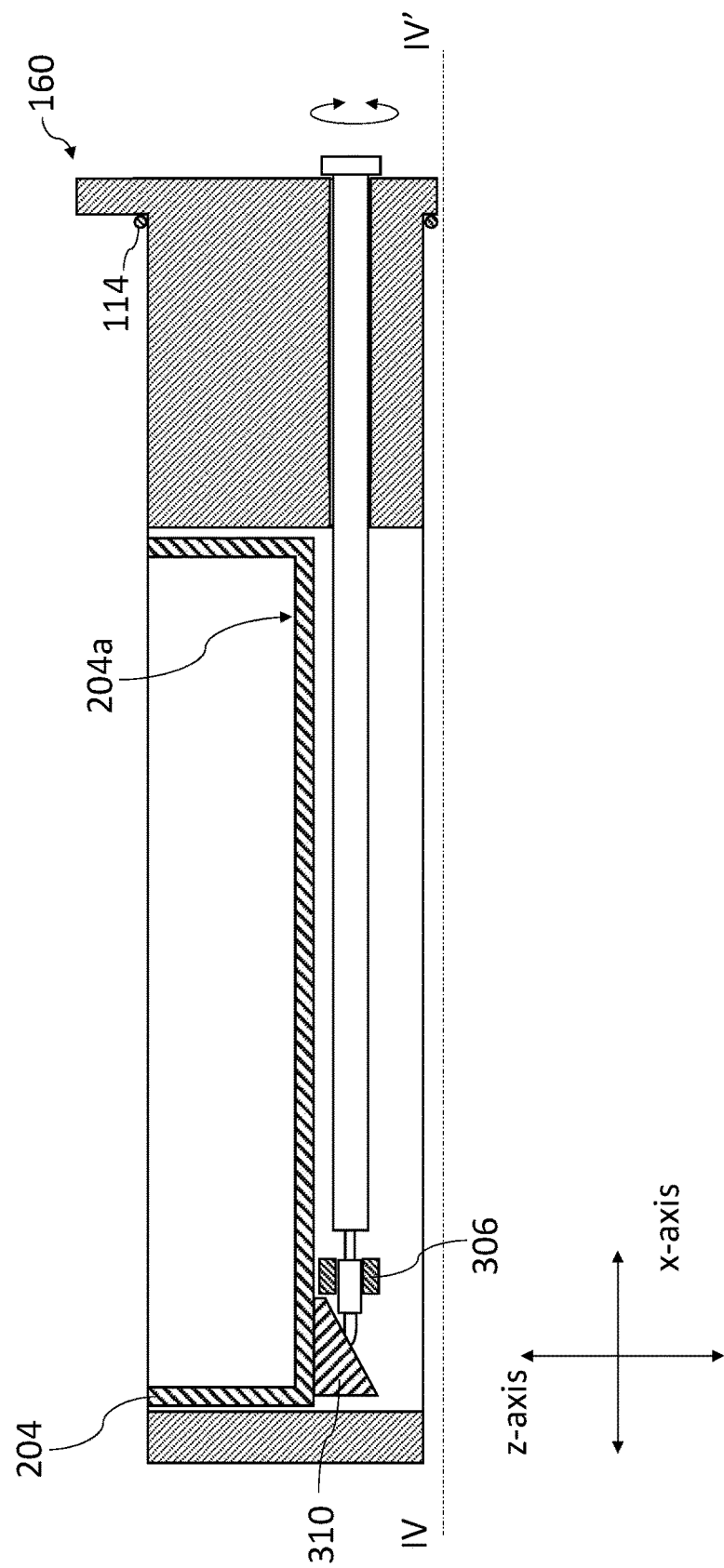
FIGS. 4 and 5 are cross-sectional views of the target support, taken along lines IV-IV' and V-V' shown in FIG. 3, respectively.
Figure 5:
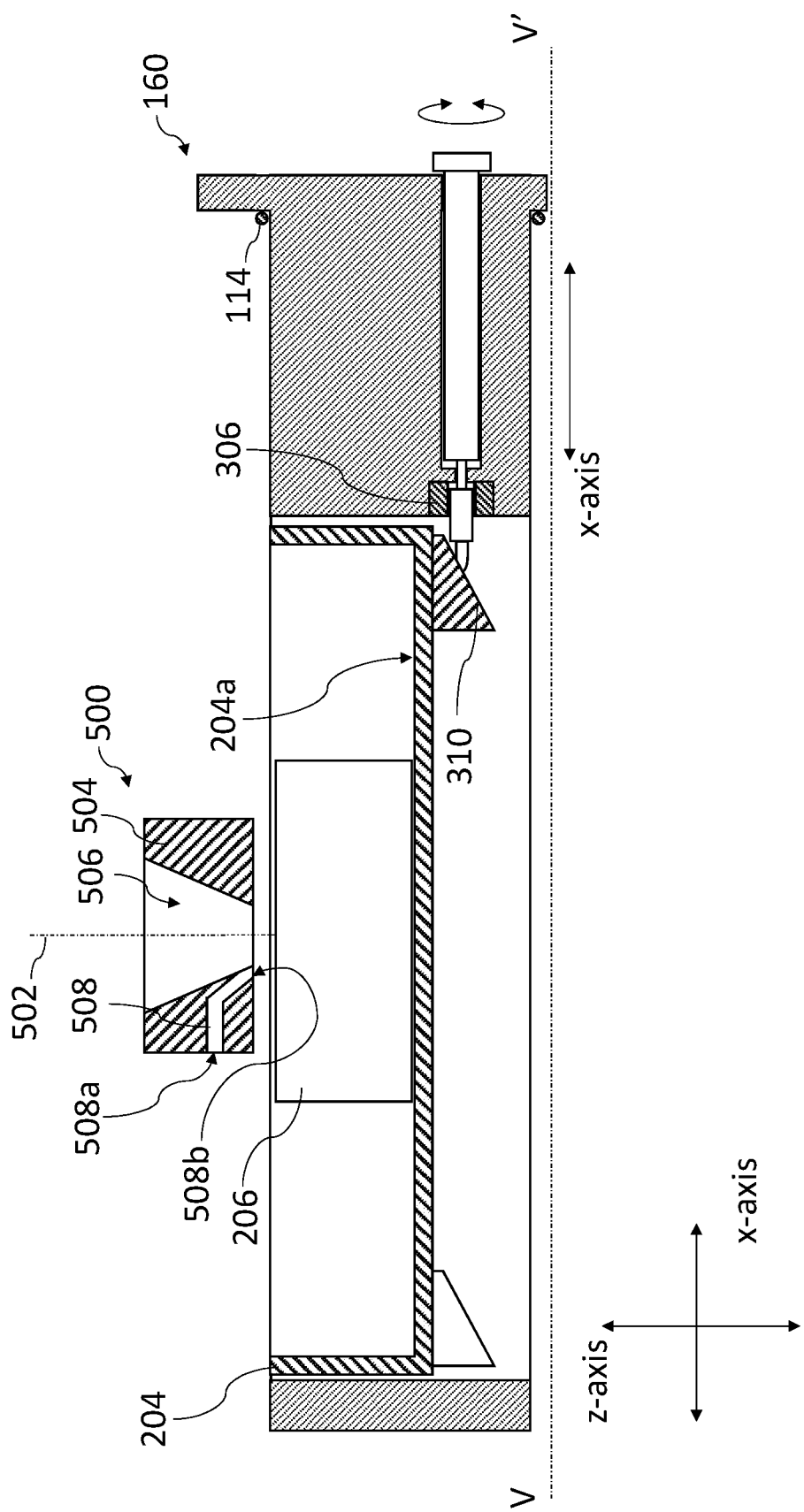

Referring to FIGS. 3 to 5, according to an example embodiment of the disclosure, the platform adjustment system may also include a plurality of adjustment mechanisms, such as first adjustment mechanism 300a, second adjustment mechanism 300b and third adjustment mechanism 300c (each generically referred to as an adjustment mechanism 300). Each adjustment mechanism 300 may be coupled to a corresponding platform adjustment knob 108. For example, first adjustment mechanism 300a may be coupled to the first platform adjustment knob 108a, the second adjustment mechanism 300b may be coupled to the second platform adjustment knob 108b and the third adjustment mechanism 300c may be coupled to the third platform adjustment knob 108c.

Each adjustment mechanism 300 may include a rod 301, an externally-threaded screw portion 302, and a tip portion 304. The rod 301 may be fixed between a platform adjustment knob 108 and a first end of an externally-threaded screw portion 302, and the tip 304 may be connected to a second end of the screw portion 302. The components of the adjustment mechanism 300 may be formed from a suitably rigid material (e.g., a metal such as an aluminum alloy, etc.) such that, when a user rotates a platform adjustment knob 108 (e.g., in a clockwise or counterclockwise direction), a screw portion 302 of the corresponding adjustment mechanism associated with the platform adjustment knob 108 may also rotate in a corresponding manner.

Each adjustment mechanism 300 may also include a threaded bore 306 configured to engage the threads of a respective screw portion 302. As shown in FIG. 3, the threaded bore 306 of the first and third adjustment mechanisms 300a and 300c, respectively, may be coupled to the support frame 202 by a bracket, such as bracket 308. The threaded bore 306 of the second adjustment 300b may be embedded within the support frame 202, as shown in FIG. 5. Constructed as described above, when a user rotates a platform adjustment knob 108, a screw portion 302 of an adjustment mechanism 300 associated with the platform adjustment knob 108 may rotate relative to a threaded bore 306 in a corresponding manner. By way of an example embodiment of the disclosure, as the screw portion 302 rotates relative to the threaded bore 306, the tip 304 connected to the screw portion 302 may be displaced along the x-axis. It should be recognized that the direction in which the tip 304 is displaced along the x-axis corresponds to the direction of rotation of the screw portion 302.

Each adjustment mechanism 300 may also include a wedge 310 fixed to a lower surface of the support platform 204. Generally, each wedge 310 may include a relatively thin end, a relatively thick end, and an inclined surface extending from the relatively thin end to the relatively thick end. Optionally, a groove 312 may be provided in the inclined surface and may be configured to receive a portion of the tip 304. According to an example embodiment of the disclosure, when the tip 304 is sufficiently displaced along the x-axis (e.g., to the left as illustrated in FIGS. 3 to 5), the tip 304 may press against the inclined surface of the wedge 310 while moving toward the relatively thick end of the wedge 306, thereby raising a region of the support platform 204 above the wedge 310. When the tip 304 is sufficiently displaced along the x-axis (e.g., to the right as illustrated in FIGS. 3 to 5), the tip 304 may press against the inclined surface of the wedge 310 while moving toward the relatively thin end of the wedge 310, thereby lowering the region of the support platform 204 above the wedge 310.

In the example embodiment illustrated in FIGS. 3 to 5, the wedge 310 of the first adjustment mechanism 300a may be located near the upper-left illustrated corner region of the support platform 204, the wedge 310 of the second adjustment mechanism 300b may be located near the center-right illustrated edge region of the support platform 204 and the wedge 310 of the third adjustment mechanism 300c may be located near the lower-left illustrated corner region of the support platform 204. Thus, one or more of the first, second and third platform adjustment knobs 108a, 108b and 108c, may be rotated (e.g., in a clockwise or counterclockwise direction) to tilt or otherwise adjust the orientation of the support platform 204 relative to the support frame 202. Likewise, each of the first, second and third platform adjustment knobs 108a, 108b and 108c, may be rotated (e.g., in a clockwise or counterclockwise direction) by the same amount to uniformly raise or lower (e.g., along the z-axis) the support platform 204, thereby adjusting the position of the support platform 204 relative to the support frame 202.

Within each adjustment mechanism 300, the thread pitch and helix angle of the screw portion 302 and threaded bore 306, and the slope of the inclined surface of the wedge 310 may be selected to raise or lower one or more regions of the support platform 204 by an amount that is less than or equal to a depth of focus of the focused beam of laser pulses directed into the sample chamber 100. Generally, the depth of focus will be in a range from 0.1 mm to 0.4 mm. In one embodiment, the thread pitch and helix angle of the screw portion 302 and threaded bore 306, and the slope of the inclined surface of the wedge 310 may be selected to raise or lower one or more regions of the support platform 204 by an amount in a range from 1 µm to 1 mm per one full rotation of a platform adjustment knob 108. In another embodiment, the thread pitch and helix angle of the screw portion 302 and threaded bore 306, and the slope of the inclined surface of the wedge 310 may be selected to raise or lower one or more regions of the support platform 204 by an amount in a range from 1 µm to 10 µm per one full rotation of a platform adjustment knob 108. In another embodiment, the thread pitch and helix angle of the screw portion 302 and threaded bore 306, and the slope of the inclined surface of the wedge 310 may be selected to raise or lower one or more regions of the support platform 204 by an amount in a range from 3 µm to 5 µm per one full rotation of a platform adjustment knob 108.

Optionally, the target support 106 may include a system of rails and grooves arranged and configured to somewhat restrict movement of the support platform 204 along the x- and y-axes, or within a plane defined by the x- and y-axes, relative to the support frame 202. For example, as shown in FIG. 3, a plurality of grooves (e.g., extending at least substantially along only the z-axis) may be formed within the side surface of the support platform 204, and corresponding rails may be formed at corresponding positions of the support frame 202. The support platform 204 may thus be inserted into a central opening the support frame 202 by inserting each rail into a corresponding groove. When the orientation and/or position of the support platform 204 is adjusted relative to the support frame 202, the grooves may slide relative to the rails somewhat to permit movement along the z-axis, but restrict undesirably excessive movement along the x- and y-axes.

Referring to FIG. 5, and as mentioned above, when the target support 106 is inserted into the sample chamber body 102, the target 206 may be arranged below the sample capture cell (illustrated in FIG. 5 at 500) of the sample chamber 100. As shown in FIG. 5, the sample capture cell 500 may be aligned with an axis along which the beam of laser pulses can propagate (i.e., optical axis 502) to ablate the target 206. The sample capture cell 500 may include a cell body 504 that defines an interior volume 506 having a cylindrical or tapered shape (e.g., intersecting the lower surface of the cell body 504 at a relatively small opening, as illustrated) and, through which, the optical axis 502 may extend.

The cell body 504 may also include an outlet conduit 508 having a first end 508a at a side surface of the cell body 504 and a second end 508b intersecting the lower surface of the cell body 504 as well as a surface of the interior volume 506. The cell body 504 may be suspended within the interior of the sample chamber body 102 by a sample transport conduit (not shown) coupled to the first end 508a of the outlet conduit 508. For example, a first end of the sample transport conduit may be coupled to the first end 508a of the outlet conduit 502, and a second end of the sample transport conduit (opposite the first end thereof) may be coupled to an ICP torch (e.g., as discussed above). Although FIG. 5 illustrates an embodiment in which the second end 508b as intersecting the lower surface of the cell body 504 and the surface of the interior volume 506, other embodiments provide the second end 508b as intersecting only the lower surface of the cell body 504, or intersecting only the surface of the interior volume 506.

To obtain a sample of the target 206, one or more laser pulses may be generated and propagated along optical axis 502 from the laser system and through the transmission window 104 into the interior of the sample chamber body 102. Thereafter, the laser pulse(s) may propagate along the optical axis 502 through the interior volume 506 of the sample capture cell 504 to ablate a portion of the target 206. Material ablated from the target 206 may be ejected from the target 206 as a plume of particles and/or vapor ejected or otherwise generated from the target 206 as a result of the ablation. During this process, the pressure within the interior of the outlet conduit 508 may be at least slightly less than the pressure within the interior of the sample chamber body 102 (e.g., the sample chamber body 102 is pressurized relative to the ICP torch coupled to the second end of the sample transport conduit).

Thus, the plume generated from the target 206 may be captured into the outlet conduit 508 via the second end 508b. In one embodiment, the orientation and/or position of the upper surface of the target 206 relative to the lower surface of the sample capture cell 500 can be adjusted by a user when the user rotates one or more of the first, second and third platform adjustment knobs 108a, 108b and 108c, as discussed above. In one embodiment, each of the first, second and third platform adjustment knobs 108a, 108b and 108c, may be rotated (e.g., in a clockwise or counterclockwise direction) by the same amount to uniformly raise or lower (e.g., along the z-axis) the support platform 204, thereby adjusting the distance between the upper surface of the target 206 relative to the lower surface of the sample capture cell 500 to be in a range from 0.0005 mm to 1 mm. In some embodiments, the distance between the upper surface of the target 206 relative to the lower surface of the sample capture cell 500 may be adjusted to be in a range from 0.001 mm to 0.08 mm, in a range from 0.001 mm to 0.05 mm, in a range from 0.001 mm to 0.03 mm, in a range from 0.001 mm to 0.01 mm, or the like or within any sub-range within or between these ranges.

Although the sample capture cell of the sample chamber 100 has been described above with reference to sample capture cell 504, it will be appreciated that the sample capture cell may be provided in any other suitable or desired manner. For example, the sample capture cell 504 may be provided as described in U.S. Patent App. Pub. No. 2014/0227776 or in U.S. Pat. No. 8,879,064 (which refers to a structure equivalent to the sample capture cell 504 as an "aerosol collector 210"), each of which is incorporated herein by reference in its entirety.

Figure 6:
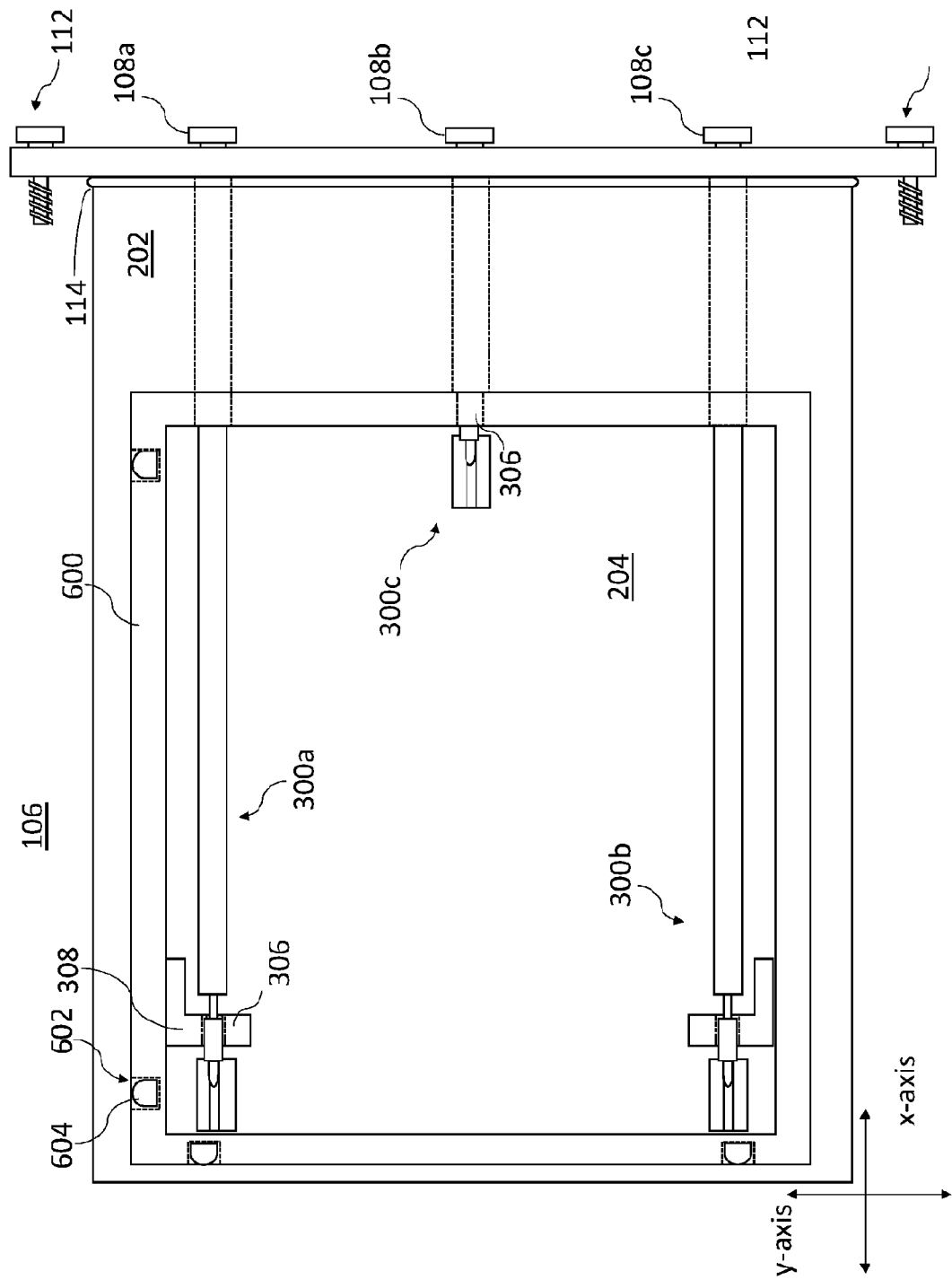
FIG. 6 is a bottom plan view of the target support shown in FIG. 2, according to another embodiment of the present disclosure.

Referring to FIG. 6, the target support 106 may, according to another example embodiment of the disclosure, may be provided in a manner similar to that described with respect to FIGS. 2 to 5. For the sake of brevity, only the features unique to the embodiment shown in FIG. 6 shall be discussed. In the embodiment illustrated in FIG. 6, the target support 106 may include a platform insert 600 interposed between the support frame 202 and the support platform 204. The support platform 204 may be configured so as to be insertable into a central opening of the platform insert 600, and the platform insert 600 may be configured so as to be relatively easily insertable into a central opening of the support frame 202.

The threaded bore 306 of the first and third adjustment mechanisms 300a and 300c, respectively, may be coupled to the platform insert 600 by the aforementioned bracket 308. The threaded bore 306 of the second adjustment 300b may be embedded within the platform insert 600.

The platform insert 600 may further include a set of recesses, such as recess 602, formed in an outer side surface thereof, and extending partially through the platform insert 600. A device, such as a spring-loaded ball plunger 604, may be inserted into each recess 602. When the platform insert 600 is inserted into the central opening of the support frame 202, the plungers 604 may press against the inner surface of the support frame 202 defining the central opening thereof, and may bias the platform insert 600 against the support frame 202.

In one embodiment, the plungers 604 may bias the platform insert 600 against the support frame 202 with a force sufficient to keep the platform insert 600 even when one or more of the platform adjustment knobs 108 is rotated (as discussed above) to adjust the orientation and/or position of the support platform 204. In this case, adjustment of the orientation and/or position of the support platform 204 may be made relative to the platform insert 600 (and, thus, the support frame 202) upon rotation of one or more of the platform adjustment knobs 108, as discussed above).

It will be understood by those within the art that, in general, terms used herein, and are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this disclosure have been illustrated, it is apparent that various modifications and embodiments of the disclosure may be made by those skilled in the art without departing from the scope and spirit of the foregoing disclosure. Accordingly, the scope of the disclosure should be limited only by the claims appended hereto.

What is claimed is:

1. A target support configured to adjustably support a target within a sample chamber, comprising:
    a support frame configured to be inserted into the sample chamber;
    a support platform disposed within the support frame; and
    a platform adjustment system coupled to the support frame and the support platform, the platform adjustment system including
        one or more adjustment rods coupled to a first end of one or more screws;
        one or more threaded bores coupled to the support frame and configured to engage threads of the one or more screws, wherein a second end of one or more screws is configured to be displaced along an x-axis when the one or more screws rotate relative to the one or more threaded bores; and
        one or more surfaces extending from the support platform, the one or more surfaces configured to change a position of the support platform relative to the support frame upon interaction between the second end of one or more screws and the one or more surfaces,
    wherein the platform adjustment system is configured to adjust at least one of: a position and an orientation of the support platform relative to the support frame when the support frame is inserted into the sample chamber.

2. The target support of claim 1, wherein the platform adjustment system further comprises:
    one or more platform adjustment knobs, wherein the one or more adjustment rods are disposed between the one or more platform adjustment knobs and the first end of one or more screws, the one or more platform adjustment knobs rotatable to engage the one or more screws;
    wherein the one or more threaded bores are coupled to the support frame by a bracket,
    wherein the second end of the one or more screws includes one or more tip portions, the one or more tip portions configured to be displaced along an x-axis when the one or more screws rotate relative to the one or more threaded bores, and
    wherein the one or surfaces extending from the support platform include one or more wedges fixed to a lower surface of the support platform, wherein the one or more wedges comprise: a relatively thin end, a relatively thick end, and an inclined surface extending from the relatively thin end to the relatively thick end, the one or more wedges configured to change a position of the support platform relative to the support frame.

3. The target support of claim 2, wherein the one or more wedges comprise a groove provided on the inclined surface and configured to receive a portion of the one or more tip portions.

4. The target support of claim 2, wherein a thread pitch and a helix angle of the one or more screws, the thread pitch and the helix angle of the one or more threaded bores, and a slope of the inclined surface of the one or more wedges are configured to modify a position of one or more regions of the support platform relative to a depth of focus of a focused beam of laser pulses directed into the sample chamber.

5. The target support of claim 2, wherein a thread pitch and a helix angle of the one or more screws, the thread pitch and the helix angle of the one or more threaded bores, and a slope of the inclined surface of the one or more wedges are configured to modify a position of the support platform in a range from 1 µm to 1 mm along the z-axis per one full rotation of the platform adjustment knob.

6. The target support of claim 1, wherein the target support further comprises a system of rails and grooves configured to partially restrict movement of the support platform along a plane defined by the x-axis and the y-axis.

7. The target support of claim 1, wherein the platform adjustment system configured to adjust at least of the position and the orientation of the support platform further comprises: adjusting the support platform along an x-axis, adjusting the support platform along a y-axis, and adjusting the support platform along a z-axis.

8. A method, comprising:
    adjusting a target support configured to support a target within a sample chamber, the target support comprising:
    a support frame configured to be inserted into the sample chamber;
    a support platform disposed within the support frame; and
    a platform adjustment system coupled to the support frame and the support platform, the platform adjustment system including
        one or more adjustment rods coupled to a first end of one or more screws;
        one or more threaded bores coupled to the support frame and configured to engage threads of the one or more screws, wherein a second end of one or more screws is configured to be displaced along an x-axis when the one or more screws rotate relative to the one or more threaded bores; and one or more surfaces extending from the support platform, the one or more surfaces configured to change a position of the support platform relative to the support frame upon interaction between the second end of one or more screws and the one or more surfaces, wherein the platform adjustment system is configured to adjust at least one of: a position and an orientation of the support platform relative to the support frame when the support frame is inserted into the sample chamber.

9. The method of claim 8, further comprising: adjusting the support platform along an x-axis, adjusting the support platform along a y-axis, and adjusting the support platform along a z-axis.

10. The method of claim 8, wherein the platform adjustment system further comprises:

one or more platform adjustment knobs, wherein the one or more adjustment rods are disposed between the one or more platform adjustment knobs and the first end of one or more screws, the one or more platform adjustment knobs rotatable to engage the one or more screws;

wherein the one or more threaded bores are coupled to the support frame by a bracket, wherein the second end of the one or more screws includes one or more tip portions, the one or more tip portions configured to be displaced along an x-axis when the one or more screws rotate relative to the one or more threaded bores, and wherein the one or surfaces extending from the support platform include one or more wedges fixed to a lower surface of the support platform, wherein the one or more wedges comprise: a relatively thin end, a relatively thick end, and an inclined surface extending from the relatively thin end to the relatively thick end, the one or more wedges configured to change a position of the support platform relative to the support frame.

11. The method of claim 10, wherein the one or more wedges comprises a groove provided on the inclined surface and configured to receive a portion of the one or more tip portions.

12. The method of claim 10, wherein a thread pitch and a helix angle of the one or more screws, the thread pitch and the helix angle of the one or more threaded bores, and a slope of the inclined surface of the one or more wedges are configured to modify a position of one or more regions of the support platform relative to a depth of focus of a focused beam of laser pulses directed into the sample chamber.

13. The method of claim 10, wherein a thread pitch and a helix angle of the one or more screws, the thread pitch and the helix angle of the one or more threaded bores, and a slope of the inclined surface of the one or more wedges are configured to modify a position of the support platform in a range from 1 µm to 1 mm along the z-axis per one full rotation of the platform adjustment knob.

14. The method of claim 8, wherein the target support further comprises a system of rails and grooves configured to partially restrict movement of the support platform along a plane defined by the x-axis and the y-axis.

15. A sample chamber configured to accommodate a target, comprising:

a sample chamber body;
a transmission window;
a sample capture cell; and a target support configured to adjustably support the target within the sample chamber, wherein the target support comprises:

a support frame configured to be inserted into the sample chamber;

a support platform disposed within the support frame; and a platform adjustment system coupled to the support frame and the support platform, the platform adjustment system including one or more adjustment rods coupled to a first end of one or more screws;

one or more threaded bores coupled to the support frame and configured to engage threads of the one or more screws, wherein a second end of one or more screws is configured to be displaced along an x-axis when the one or more screws rotate relative to the one or more threaded bores; and one or more surfaces extending from the support platform, the one or more surfaces configured to change a position of the support platform relative to the support frame upon interaction between the second end of one or more screws and the one or more surfaces, wherein the platform adjustment system is configured to adjust at least one of: a position and an orientation of the support platform relative to the support frame when the support frame is inserted into the sample chamber.

16. The sample chamber of claim 15, wherein the platform adjustment system configured to adjust at least of the position and the orientation of the support platform further comprises: adjusting the support platform along an x-axis, adjusting the support platform along a y-axis, and adjusting the support platform along a z-axis.

17. The sample chamber of claim 15, wherein the platform adjustment system further comprises:

one or more platform adjustment knobs, wherein the one or more adjustment rods are disposed between the one or more platform adjustment knobs and the first end of one or more screws, the one or more platform adjustment knobs rotatable to engage the one or more screws;

wherein the one or more threaded bores are coupled to the support frame by a bracket, wherein the second end of the one or more screws includes one or more tip portions, the one or more tip portions configured to be displaced along an x-axis when the one or more screws rotate relative to the one or more threaded bores, and wherein the one or surfaces extending from the support platform include one or more wedges fixed to a lower surface of the support platform, wherein the one or more wedges comprise: a relatively thin end, a relatively thick end, and an inclined surface extending from the relatively thin end to the relatively thick end, the one or more wedges configured to change a position of the support platform relative to the support frame.

18. The sample chamber of claim 17, wherein the one or more wedges comprises a groove provided on the inclined surface and configured to receive a portion of the one or more tip portions.

19. The sample chamber of claim 17, wherein a thread pitch and a helix angle of the one or more screws, the thread pitch and the helix angle of the one or more threaded bores, and a slope of the inclined surface of the one or more wedges are configured to modify a position of one or more regions of the support platform relative to a depth of focus of a focused beam of laser pulses directed into the sample chamber.

20. The sample chamber of claim 17, wherein a thread pitch and a helix angle of the one or more screws, the thread pitch and the helix angle of the one or more threaded bores, and a slope of the inclined surface of the one or more wedges are configured to modify a position of the support platform in a range from 1 μm to 1 mm along the z-axis per one full rotation of the platform adjustment knob.

\* \* \* \* \*